Aug. 28, 1951 C. S. FRANCIS, JR 2,565,491
FILM STRUCTURES AND METHODS FOR PRODUCING THE SAME
Filed June 20, 1945 6 Sheets-Sheet 1
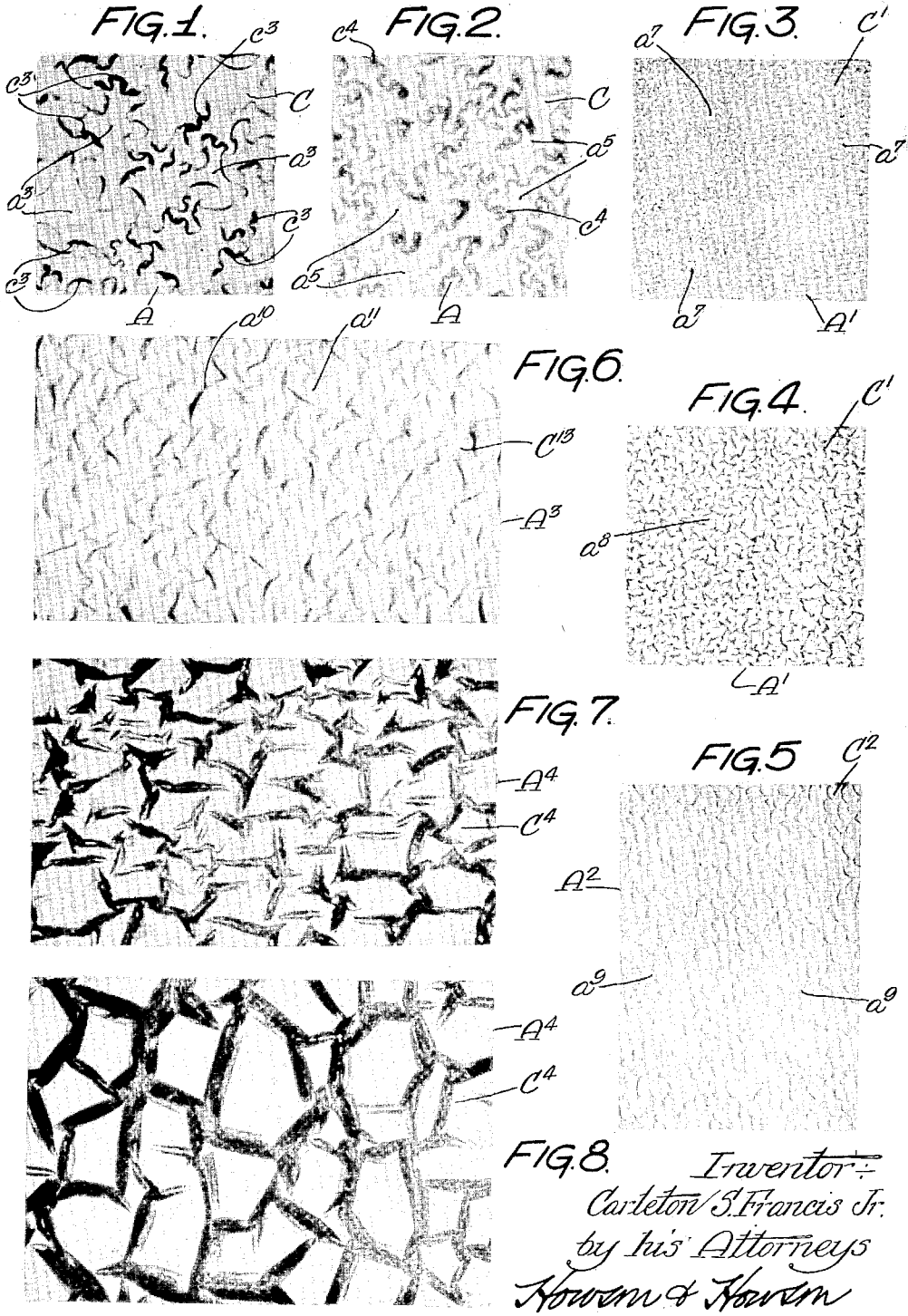
Inventor:
Carleton S. Francis Jr.
by his Attorneys
Howson & Howson Aug. 28, 1951 — C. S. FRANCIS, JR — 2,565,491
FILM STRUCTURES AND METHODS FOR PRODUCING THE SAME
Filed June 20, 1945 — 6 Sheets-Sheet 2

Inventor:
Carleton S. Francis Jr.
by his Attorneys
Howson & Howson

Aug. 28, 1951     C. S. FRANCIS, JR     2,565,491
FILM STRUCTURES AND METHODS FOR PRODUCING THE SAME
Filed June 20, 1945     6 Sheets-Sheet 3

Inventor:
Carleton S. Francis Jr.
by his Attorneys
Howsen & Howsen

Aug. 28, 1951  C. S. FRANCIS, JR  2,565,491
FILM STRUCTURES AND METHODS FOR PRODUCING THE SAME
Filed June 20, 1945  6 Sheets-Sheet 4

Inventor:—
Carleton S. Francis Jr.
by his Attorneys
Howson & Howson

Aug. 28, 1951  C. S. FRANCIS, JR  2,565,491
FILM STRUCTURES AND METHODS FOR PRODUCING THE SAME
Filed June 20, 1945  6 Sheets-Sheet 5
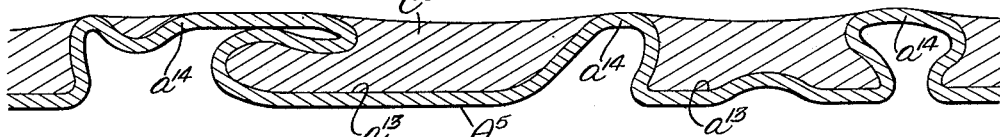
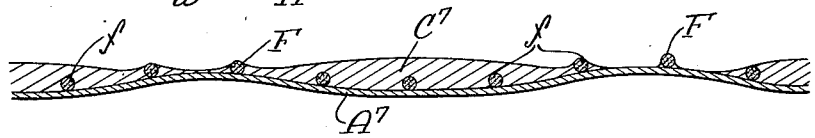
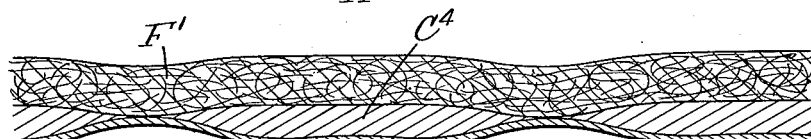
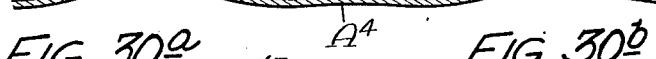
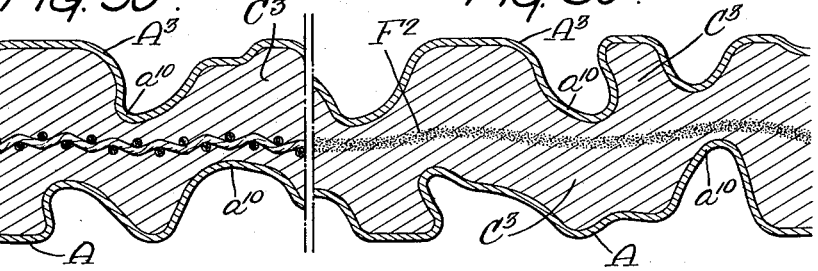
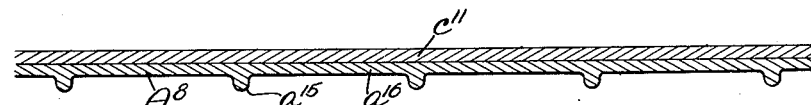
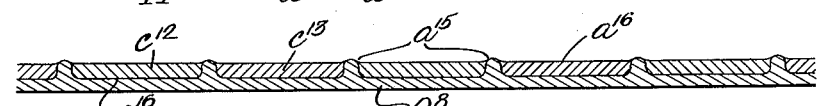
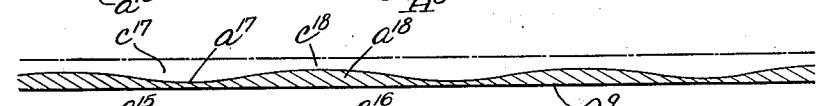
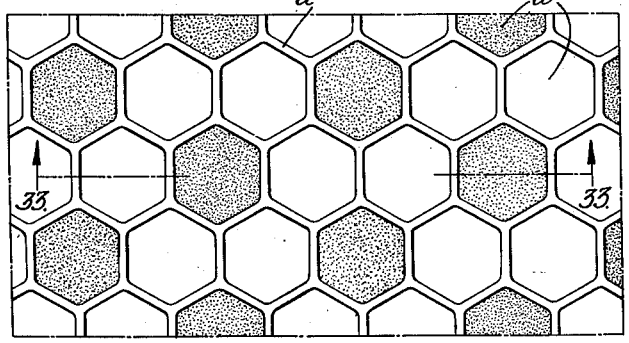
Inventor:
Carleton S. Francis Jr.
by his Attorneys
Howson & Howson Aug. 28, 1951     C. S. FRANCIS, JR.     2,565,491
FILM STRUCTURES AND METHODS FOR PRODUCING THE SAME
Filed June 20, 1945     6 Sheets-Sheet 6
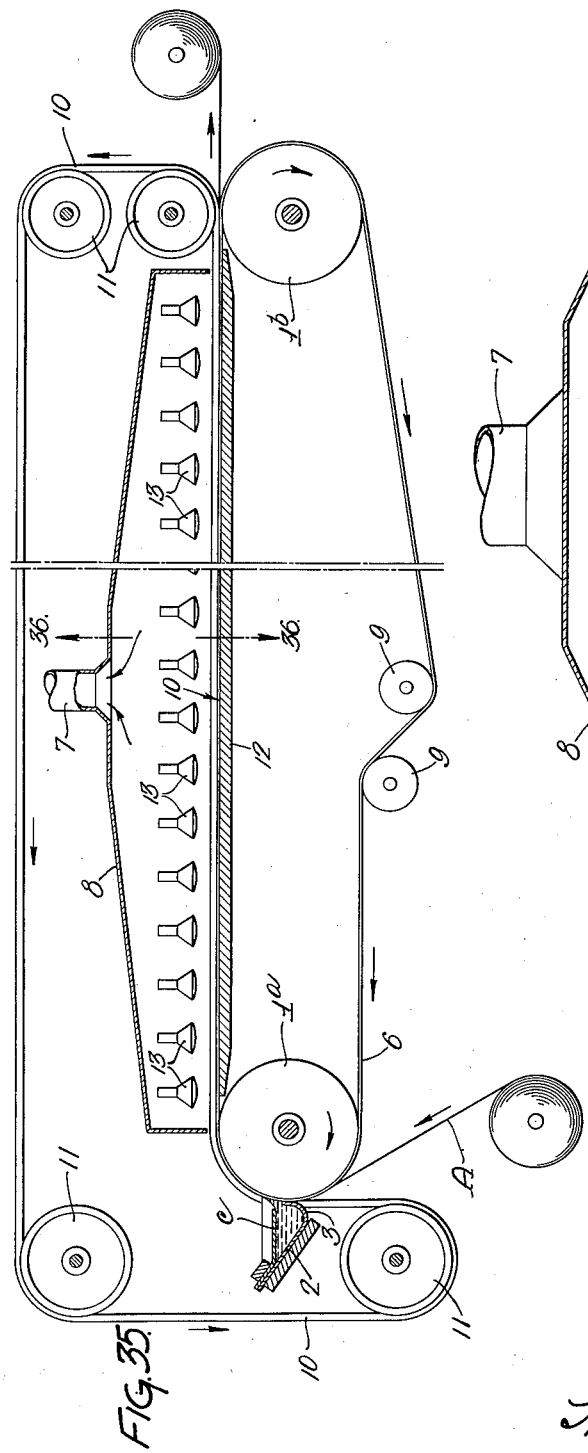
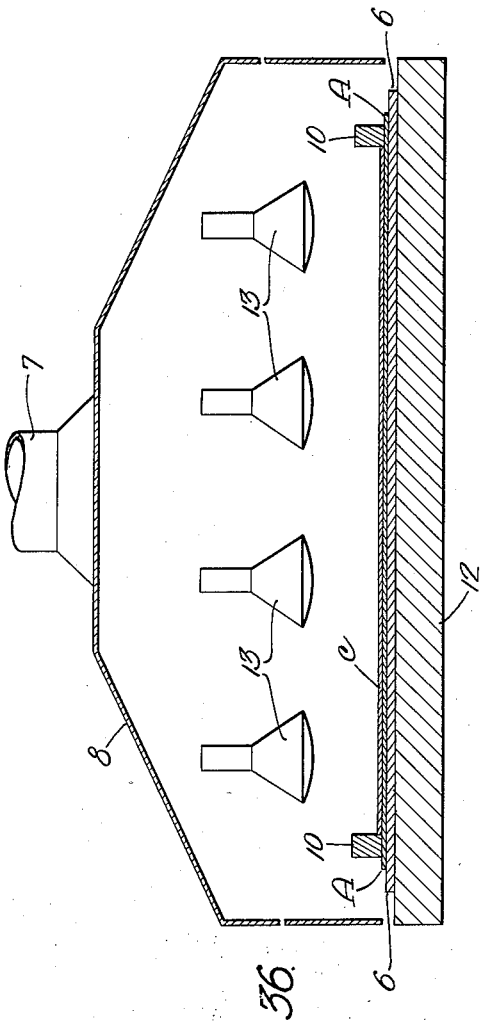
Inventor:
Carleton S. Francis Jr.
by his Attorneys
Howson & Howson Patented Aug. 28, 1951

2,565,491

UNITED STATES PATENT OFFICE 2,565,491

FILM STRUCTURE AND METHOD FOR PRODUCING THE SAME

Carleton Shurtleff Francis, Jr., West Harwich, Mass.

Application June 20, 1945, Serial No. 600,583

13 Claims. (Cl. 154—121)

This invention relates to novel film materials and to a method for imparting designs thereto. More particularly, the present invention relates to the production of distorted films for esthetic decorative and/or purely utilitarian purposes in the industrial, interior decorating, wearing apparel, personal luggage, upholstery, household, novelty and many other fields.

The products of the present invention are manufactured from plastic, film-forming materials such, for example, as synthetic resinous materials capable of being produced in a variety of attractive designs. In addition to their novel appearance, the articles of the present invention possess certain advantageous physical properties not heretofore available in film materials.

Prior to the present invention, difficulties have been present in the production of decorative films from plastic film-forming materials, for example, such decorations as have been provided by printing or embossing; and the films previously available have generally been of a plain smooth-surfaced non-esthetic character, with the result that the use of the films has been greatly restricted. In the printing of films, difficulties have been encountered in obtaining a clear-cut, satisfactory design, due to the tendency of the printing ink to flow over the smooth glossy surface of the film, because of the inability of the ink to penetrate the film to any appreciable extent. In embossed films, particularly those possessing flexibility, the embossed design is not sufficiently permanent to warrant popularity because, upon subjecting of the film to pressure or tension, the embossed design becomes distorted and is at least partially destroyed. In addition, designs imparted to films by embossing are necessarily limited to such as can be engraved on a plate or roll.

In order to provide a translucent or opaque film, according to prior art practices, pigments or fillers have been incorporated with the plastic film-forming material from which the film is formed, with the disadvantageous result that particles of the pigment or filler are present at the surface of the film.

The smooth-surfaced film materials possess many other disadvantages in that they present an objectionable clinging "hand" or "feel" to the wearer of articles of apparel made therefrom. Furthermore, when this type of material is formed in long strips and stored in rolls, or is made in the form of sheets and stored in stacks, it is difficult, unless an interliner is used between the layers, to separate the layers one from another.

One object of the present invention, therefore, is to provide a decorative or utility film comprising plastic film-forming material to which a permanent pattern or design has been imparted, without printing or embossing, and which is devoid of each and all of the stated disadvantages present in the film materials heretofore available.

Another object of the invention is to provide film materials having diversified permanent decorative effects constituted primarily by the presence of irregularly interspersed non-uniformly dimensioned and variably contoured raised and depressed portions of the film disposed in adjacent abutting relation to each other on at least one surface thereof, and spread over either the entire area of the surface of the film or within predetermined restricted areas thereof only, but which, as distinguished from designs provided by embossing, will withstand being subjected to pressure and/or tension without destroying the general character of the decorative design or pattern effect.

Another object of the invention is to provide a film material having a design, formed as previously noted, by irregularly arranged raised and depressed portions wherein the general effect is chromatically modified by the inclusion therein of contrasting color or color shade effects, giving the decorative face of the film a general appearance of having been both printed and embossed.

Still another object of the present invention is to provide translucent or opaque films wherein the surface of the film which will be subjected to wear during use will be devoid of exposed particles of pigment or filler substances, so that, during the normal life of the film, crocking and discoloration of such exposed particles of the pigment or filler will be eliminated.

A further object of the present invention is to furnish a film-material having the general appearance of leather, or leather cloth, and which, therefore, will be suitable, not only by reason of its appearance but also because of its desirable physical properties, for use in fields where leather or leather cloth is normally employed.

A further object of the invention is to provide a composite, decorative film structure, wherein one exposed face of the decorative film will have a lower thermal tacking point than the opposite face thereof, whereby the composite film, when the surface having the lower thermal tacking point is brought into contact with an exposed face of some other structure or material will be caused to adhere thereto by the application of heat and pressure, without rendering tacky or otherwise detrimentally affecting the design on the surface having the higher tacking point.

Still another object of the present invention is to provide a composite decorative film structure wherein textile fibres, in a loose web or batt form, or incorporated into a suitable textile fabric, form an integral part of the composite structure whereby the film is rendered dimensionally stable and of improved strength, and wherein the fibres or fabric may be caused to impart to the film material additional decorative effects, if desired.

Still another object of the invention is to provide a film material which will possess an uneven, rough or multi-directionally undulated, ribbed, or rippled surface which will afford air-spaces between the film surface and other objects with which the film surface may make contact, so that the objectionable clinging action characteristic of smooth-surfaced films of the prior art will be avoided when the film structure of the present invention is in use.

Other objects, including the provision of novel methods by which film materials and structures falling within the scope of the present invention may be readily and economically manufactured, will be apparent from a consideration of the following specification, the appended claims, and the accompanying drawings, of which:

Figs. 1 to 12 inclusive respectively are photographic illustrations, in actual size, of fragments of decorative films embodied in the present invention;

Figs. 13 to 19 inclusive illustrate a sequence of steps in and results obtained by one embodiment of the process forming part of the present invention, and wherein Fig. 19 depicts a typical cross-section of the film structures shown in Figs. 1 and 2 respectively and drawn to an enlarged scale;

Figs. 20 to 23 inclusive illustrate a sequence of steps in and results obtained by another embodiment of the process forming part of the present invention, and wherein Fig. 23 depicts an enlarged typical cross-section of the film structures shown in Figs. 3 and 4 respectively;

Fig. 27 is an enlarged typical cross-section of the film structure shown in Figs. 10 and 11 respectively;

Fig. 28 is an enlarged typical cross-section of the modified film structure shown in Fig. 12;

Fig. 29 is a view similar to Fig. 26 and showing a laminated structure including the decorative film and a backing element therefor;

Figure 25:
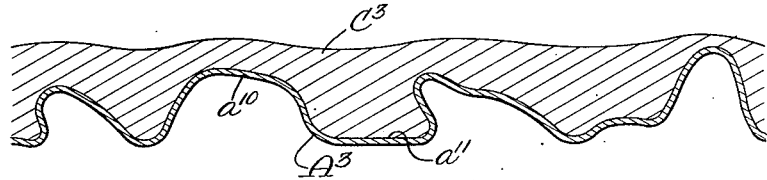
Fig. 25 is an enlarged typical cross-section of the film structure shown in Fig. 6.

Figs. 30a and 30b respectively illustrate laminated film structures composed of two decorative films arranged back-to-back, such as the one shown in Figs. 6 and 25, with Fig. 30b further illustrating the use of a dimensional stabilizing, reinforcing, or stiffening sheet disposed between the adjacent back surfaces of the two film structures;

Fig. 31 depicts a face view of a modified form of decorative film made in accordance with the present invention;

Fig. 32 illustrates a typical cross-section of the film structure shown in Fig. 31 under one course of procedure during manufacture;

Fig. 33 illustrates an enlarged typical cross-section through a film structure substantially corresponding to that shown in Fig. 31 under a different course of procedure during manufacture;

Fig. 34 is an enlarged typical cross-section of a modified form of primary film adapted for use in accordance with the principles of the present invention;

Fig. 35 is a diagrammatic longitudinal sectional elevation of an apparatus adapted for making decorative films in continuous strip form in accordance with the principles of the present invention; and Fig. 36 is a transverse sectional elevation taken on the line 36—36, Fig. 35.

The decorative films of the present invention are produced by causing and controlling expansion of a primary film in the plane thereof and in a direction normal to said plane, by bringing the primary film into contact with an organic liquid, possessing or being capable of effecting at least a partial solvent action on the film which will generate a pattern in the film in the form of irregularly interspersed, non-uniformly dimensioned, and variably contoured, relatively raised and depressed portions created in the primary film; and by setting or stabilizing the expanded primary film to obtain decorative effects therein. Since the decorative effects are generated by the primary film due to the inherent or innate nature of the film and are not formed by mechanical action, such as embossing, the decorative effects obtained may be designated as ingenerated and there will not be a repetition of an identical pattern in any length of the primary film, although the film will be characterized by a general similarity in appearance over the design area thereof.

The organic liquid may be brought into contact with the primary film in any desired manner, for example by washing, spraying, flooding, or coating the film with, or by otherwise superimposing the organic liquid on, one surface of the primary film.

As stated, in order to obtain the decorative effects, it is necessary to set or stabilize the expanded primary film before it has had an opportunity to resume its original unexpanded condition and this is accomplished by casting a secondary or superimposed film upon the primary film to provide a composite product having a permanent pattern.

Heretofore, while it has been known that an organic liquid which contains a solvent for a film will cause expansion or distortion of the film when brought into contact therewith, no effort has been made heretofore to control such expansion or distortion of the film, and there has been no recognition of the possibility of utilizing this phenomenon to produce film materials with esthetic effects and having other desirable properties.

The term "organic liquid possessing or being capable of effecting at least a partial solvent action on the preformed film," as used herein, refers both to the organic liquids which are only semi-solvents for the film, but which soften or swell the film, and to the organic fluids which are true solvents for the fiilms. In the latter case, as will hereinafter be discussed, care must be taken to evaporate the organic fluid before it has had an opportunity to dissolve the preformed film.

In accordance with the present invention, a preformed vinyl resin film is spread out to extend over a predetermined area of a suitable bearing surface which may be permeable or impermeable and of a continuous or interrupted planar or curvilinear nature, to which the film may or may not be adhesively attached in whole or in part as desired, depending upon the ultimate result desired. The preformed film, while bearing against said surface, may be held against accumulative body expansion between its opposite faces in directions parallel thereto, i. e. planar expansion, beyond a predetermined portion of the full area of the film. While the preformed film is thus retained, an organic liquid possessing or being capable of effecting at least a partial solvent action on the preformed film is applied to the exposed face of the film. The organic liquid causes the preformed film to expand locally in its own plane and, as it is held against accumulative planar expansion beyond the limits of the aforesaid predetermined portion of its full area, these local expansions cause the film to buckle at a number of relatively spaced points within the confined area; and because the distortive buckling of the film cannot follow a perpendicular course in one direction, due to the presence of the adjacently disposed bearing or supporting surface, this distortive buckling of the film, constantly increasing as a result of continued localized planar expansions of the film within the aforesaid restricted area thereof, takes a perpendicular course in the opposite direction with respect to the normal plane of the film, or, in other words, raised with respect to the aforesaid bearing surface. The primary preformed film is thereby formed into the aforesaid irregularly interspersed relatively raised and depressed portions, the nature of which will further be discussed hereinafter.

A secondary film of organic film-forming material, namely a vinyl resin film, is cast upon the preformed film while it remains in its expanded state. Preferably, the organic film-forming material of which the secondary film is composed will be dissolved in the organic liquid employed to cause the distortive expansion of the primary preformed film, but, if desired, the liquid possessing the partial solvent action which causes the distortive buckling of the preformed film may be first applied and subsequently followed by the application of film-forming material in an organic solvent solution, while the preformed film is still in an expanded state.

During evaporation of the organic liquid or liquids, the decorative effects may be changed, as will be hereinafter discussed, and the secondary film of organic film-forming material, when cast or deposited upon the preformed film, sets or stabilizes the decorative effects so that they are thereafter permanently retained in the composite film formed of the distorted primary film and the stabilizing secondary film.

The evidence indicates that the preformed film serves as a semi-permeable membrane for vapors of the organic fluid, and that, when the supporting surface is substantially impermeable, the vapors passing through the film replace at least partially the vacuum which would otherwise be created between the underside of the preformed film and its underlying support, when the perpendicular component force resulting from the planar expansion of the film causes such upward expansion. It is also believed that the permeating vapors fill the spaces between the raised portions of the film and the supporting surface and in this way all the effects of any retarding vacuum beneath the preformed film is overcome, so that controlled expansion of the preformed film can take place without hindrance. These permeating vapors, by filling the spaces between the raised portions of the film and its underlying supporting surface, appear to become trapped therein and to serve to prevent collapse of the raised portions of the preformed film, to maintain the pattern initially created by the expansion of the preformed film until the secondary stabilizing film is cast and during a subsequent reactionary contraction of the preformed film, and a concurrent contraction of the secondary cast film as evaporation of the solvents therein contained progresses. It is for this reason that the use of an impermeable or substantially impermeable underlying support is recommended.

By the present invention, it is possible to obtain a wide variety of distinctive and unique decorative effects, and the particular type of decorative effect obtained is dependent upon a number of control factors. Among the most important of these control factors is the chemical composition of the preformed film, including the type of resin employed, the amount and type of plasticizer, if any, and the amount and type of pigments and fillers, if any; the thickness of the preformed film; whether the preformed film has been obtained by a casting or a calendering process; the degree and type of adhesion of the preformed film to the supporting surface; the degree of permeability of the supporting surface; whether the supporting surface is continuous or interrupted over its film contacting area; the type of organic liquid applied to the preformed film; whether or not a secondary film-forming material is dissolved in the organic liquid and the amount thereof; the weight and depth of the organic liquid above the preformed film; the method by which the organic liquid is applied to the preformed film; the relation of the plane of the preformed film with respect to the horizontal during and subsequent to the application of the organic liquid thereto; and the temperature of the preformed film, the superimposed liquid and the surrounding atmosphere during the period of treatment. The various types of decorative effects obtained are respectively reproducible if the various control factors therefor are maintained constant, or these effects may be partially or wholly varied by changing one or more of the aforesaid control factors.

The preformed film comprises an organic solvent-soluble synthetic resinous material which expands upon the application thereto of an organic liquid having a partial solvent action on the film, namely, as stated, a vinyl resin film, which term includes vinylidene resin film.

Examples of vinyl resin films adaptable for use under the present invention are films prepared from copolymers of vinyl chloride and vinyl acetate, such as the "VY Series" of the "Vinylite Products" of Carbide and Carbon Chemicals Corporation, for example, "VYHH," "VYNU," VYNW," and "VYNS," the use of one of the last three named being preferred due to the fact that they are only partially soluble in a wider range of organic solvents. Further examples of vinyl resins are the copolymers of vinyl chloride and vinylidene chloride, such as the "Geon Series 200" manufactured by B. F. Goodrich Company; and the vinyl chloride polymers manufactured by B. F. Goodrich Company under the designation "Geon Series 100," and by the Carbide and Carbon Chemicals Corporation under the designation "Q Series." A further example is a film formed of polyvinyl butyral modified so as to make it thermosetting or heat-curable. The polyvinyl butyral may be modified, for instance, by the addition of phenol-formaldehyde or urea-formaldehyde resins. Examples of thermosetting polyvinyl butyral resins are products sold under the name of "Haydenite" by the Stanley Chemical Company and comprising a polyvinyl butyral resin and about 10% of a phenolic resin, and the thermosetting polyvinyl butyral resins sold by the Monsanto Chemical Company, for example, the product sold under the designation "Formula TSDB6304–S."

An example of vinylidene resin film is the "Saran" film sold by the Dow Chemical Company; for example, the "Saran" film prepared from a copolymer of vinylidene chloride and vinyl chloride in which the vinylidene chloride is the major constituent. The above-mentioned resins are examples of vinyl esters and vinyl acetals.

The preformed film employed may be produced by a casting process or by a calendering process. In general, the thinner films are obtained by casting, for example, films having a thickness from a few fractions of a mil up to approximately 2 mils. Thicker films in the range of about 3 to 8 mils or more, are usually produced by a calendering process. The film employed in the present invention may be of any desired thickness. However, since the thickness of the film constitutes one of the control factors under the present invention, it is noted that the thinner the film in general the smaller will be the design obtained, when all the other control factors are maintained constant. In most instances, in the case of cast films, the use of a film of about 1 or 2 mils is preferred. In the case of calendered films, wherein the resin molecules are somewhat oriented in the direction of the calendering, there is some tendency for the decorative design to become oriented in that direction, which tendency is not markedly present in the design or pattern when cast films are employed. For this reason, a somewhat different design may be obtained when using a calendered film than would be obtained when using a cast film with all other control factors remaining constant.

The preformed film may or may not contain one or more plasticizers, depending upon the purpose for which the decorative film of the present invention is produced. As is well known in the resin art, the presence of plasticizers in the film renders it more flexible and, in the case of the present invention, the presence of the plasticizer renders the film more susceptible to expansion and more permeable to the solvent vapors. For these reasons, it is usually desirable to include in the preformed film from about 10% to 30% or even 40% plasticizer, the amount employed depending upon the particular plasticizer incorporated in the film. Any of the usual plasticizers known in the resin art and suitable for the particular resin employed may be present in the preformed film, such for example as dioctyl phthalate, tricresyl phosphate, triethylene glycol, methyl acetyl ricinoleate, butyl acetyl ricinoleate, dibutoxyl ethyl phthalate.

As one means of obtaining color effects or of producing an opaque product, a pigment or a filler or both may be included in and distributed through the preformed film, if desired, and the amount thereof may be varied, as desired, provided of course, that there is sufficient of the resin present to form a continuous film which will expand as hereinabove described.

As above stated, the preformed film is supported on a suitable surface with the predetermined areas which are to be treated held against planar expansion beyond these restricted areas, but the film is expansible upwardly, that is in a direction perpendicularly to the normal plane of the film, by and upon application of the organic liquid to the exposed surface of the preformed film. The preformed film may be supported on any still or traveling surface, inert to the organic liquid vapors. Preferably the preformed film is supported on an impermeable still surface such as glass polished or sand-blasted etc., stone, metal, glazed or coated paper, vulcanized fibre, or the like. However, the preformed film may be supported by a moving surface such as a flexible endless belt conveyer traveling over a rigid supporting surface, in a manner similar to the disclosure in my copending application Serial No. 571,048 filed January 2, 1945 (now Patent No. 2,439,802).

The area of the film to be treated may be held against planar expansion in any suitable manner. If only the center portion of a sheet of film of predetermined length and width, for example, is to be treated on a still flat surface, the marginal edges of the film itself may serve to hold the treated areas against planar expansion. Preferably, however, the film is held against planar expansion by the marginal edges of the film being engaged by tapes or clamps or by the lower edges of a suitable frame into which the solution is poured.

If a continuous web or strip of the preformed film is supported on a moving surface, in a manner similar to that disclosed in my aforesaid copending application, the lateral marginal edges of the traveling film may be held and gripped between the surface of the underlying conveyer and the lower edges of a pair of traveling straps, similar to the deckle straps of a paper making machine, as will be more fully disclosed hereinafter.

Advantageously, the organic liquid is applied to the preformed film while the film is still supported on the surface upon which it has been cast or calendered. Thus, the preformed film may be cast upon glass, metal, coated paper, or like surface with the adhesion between film and its surface being relied upon to hold the film against planar expansion.

In one embodiment of the invention, the preformed film is cast from a solution upon a waxed paper, or upon a paper having a coating of a thermosetting resin in its final state of cure, for example, a paper coated with a heat-converted urea-formaldehyde or melamine-formaldehyde resin, and it has been found that the bond between the film and the coated paper is sufficient to hold the preformed film against planar expansion.

In the case of the traveling web, supra, the film is preferably cast upon the surface of a coated paper, which in turn would be supported by the traveling conveyer belt.

In any case, the bond between the film and its supporting surface must be of a sufficiently frangible nature to permit vertical distortion or perpendicular expansion of the preformed film upon the application of the organic liquid to the exposed surface thereof.

Figure 9:
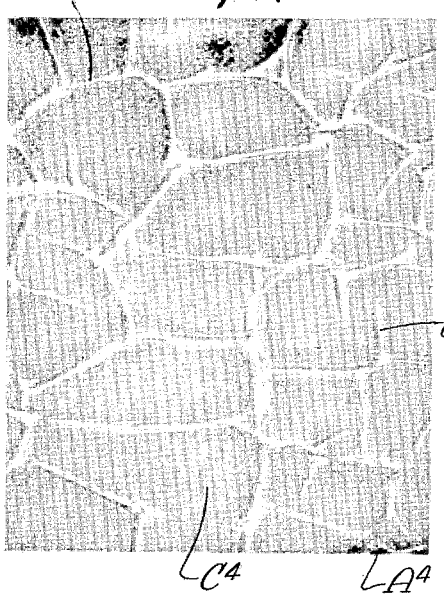

The releasability of the film from its immediately underlying surface upon application of the organic liquid to the exposed surface of the film is one of the control factors determining the decorative effect obtained in the final product. Generally speaking, the more easily the film is released, the smaller will be the decorative effect, and, conversely, the stronger the bond between the film and its direct supporting surface, the larger will be the design, all other factors being maintained constant. This is demonstrated, for example, (a) by placing a given preformed film upon a clean glass surface and (b) by placing a piece of the same film upon a glass surface which has had applied thereto a very thin film of a tacky substance such as glycerine or a petroleum jelly such as "Vaseline," etc. The organic liquid which exerts a partial solvent effect upon the preformed film causes the preformed film of (a) supra to expand in a plurality of relatively small peaks, such as shown in Fig. 7 of the accompanying drawings whereas, in the case of (b) supra the organic liquid solvent effect will cause the preformed film to expand to form a number of irregularly intersecting ridges, with relatively large flat areas therebetween, such as shown in Fig. 9.

As above stated, the degree of permeability of the supporting surface is also a control factor, and, except in the case where the decorative effect is set or stabilized very rapidly, or by pressure, the support should be substantially impermeable in itself or be backed by another substantially impermeable surface to trap the organic liquid solvent vapors between the expanding preformed film and its supporting surface in order that the design desired may be retained in the finished product. For example, if instead of placing the film upon the glass surface as referred to in the preceding paragraph, it is placed upon a foraminous surface, such as a screen, the decorative effect would at first be formed but would disappear during the subsequent evaporation of the solvent, the casting of the secondary superimposed film, and the final drying of the product due to the absence of the solvent vapors in the voids created between the raised portions of the film and the film supporting surface during the expansion of the film, unless the foraminous support be backed by an impermeable supporting surface.

If, as distinguished from the use of glass on the one hand and the use of a foraminous support on the other hand, a slightly permeable support, such as blotting paper is used, the decorative effect will be retained but in a much lesser degree. It is for this reason that the use of a substantially impermeable surface is preferred, as stated above.

The organic liquid causing the preformed film to expand, as herein described, may be any one of a number of organic solvents or mixtures thereof, and the particular organic liquid employed will depend upon the preformed film to be treated. The organic liquid used is preferably one which is a partial or semi-solvent (i. e. a swelling agent) for the preformed film, rather than a true solvent therefor. If a true solvent is used, it must be employed in such manner that its action may be arrested at will, in order that the preformed film will not be dissolved, excessively distorted, or otherwise lose its film form.

In the preferred embodiment of the invention, the film-forming material forming the secondary film cast upon the primary preformed film is dissolved in the organic liquid and, hence in this case, the liquid must be a solvent for the film-forming material as well as possess a partial solvent action for the preformed film.

When the film-forming material is dissolved in the organic liquid, the degree of saturation of the film-forming material in the liquid, that is, the viscosity or concentration of the organic liquid, will control to some extent the action of the liquid on the preformed film, for example, the rapidity of the action of the organic liquid, whether it be a true or a semi-solvent, and consequently the degree of expansion of the preformed film, will be lessened substantially by the partial saturation of the organic liquid by the secondary film-forming material. It is therefore, possible to retard the action of a true solvent for the preferred film sufficiently to permit expansion of the film without destruction of its film form.

The viscosity of the organic liquid will of course depend upon the amount of film-forming material dissolved therein and the liquid may be in the form of a thin liquid, a viscous liquid, or even in the form of a gel. In view of the fact that in the gel as well as in the liquid, the resin is in solution in a solvent, the term "solution of the resin" includes both the liquid and the gel. In the case of secondary film forming material being in the form of a gel, it is desirable to render the gel liquid before it is applied to the performed film, for example, by applying heat, but if desired the gel may be merely spread upon the preformed film and the action permitted to take place.

In the case where the secondary film-forming material comprises material which at normal room temperature is in the form of a gel but which for the purpose has been put in liquid form by elevating the temperature, it is found that the pattern is formed rapidly and that immediately following the formation of the pattern the film-forming material reverts back to its gel form and accordingly holds the pattern in a more elevated state than in those cases where the organic liquid remains in liquid form until the solvent is evaporated. The resultant composite film will, therefore, have a pattern of greater depth and, due to the rapid stabilizing action, the preformed film may be supported on a permeable support. One desirable feature of using a permeable support is that it permits evaporation of the organic liquid from both sides of the film.

If desired, instead of permitting maximum expansion of the particular preformed film employed, the expansion thereof may be arrested in any suitable way, for example, by the rapid evaporation of the solvent.

Instead of applying the solution in the form of a liquid or gel, it may be desirable, in certain instances, to absorb the organic liquid containing the film-forming material in solution by an absorbent material such as absorbent cloth, felt, paper, or the like and to apply the saturated material to the preformed film. By this procedure, the preformed film will expand in the manner hereinabove described and after the evaporation of the organic liquid, the decorative effect will not only be set or stabilized by the cast film but the absorbent material may be adhered to the composite film as a backing therefor, particularly when pressure is applied prior to the evaporation of the solvent.

As an alternative proceure, the preformed film may be first treated with the organic liquid alone and after the preformed film has expanded but before it has dried a solution of the film-forming material may be applied. In this case, the solvent of the solution containing the film-forming material should be miscible with the organic liquid first applied to the preformed film but it need not possess a solvent action on the preformed film. Obviously, the simpler procedure of dissolving the film-forming material in the organic liquid causing the expansion of the preformed film would be the more desirable.

The organic liquid to be applied to the preformed film depends upon the synthetic resin constituents of the film, and a mixture of two or more organic liquids can be employed if desired. For example, the action of the true solvent may be modified by diluting it with a miscible semi-solvent.

In the case of the various vinyl resins preformed films mentioned, with the exception of "VYHH," the following organic liquids or mixtures thereof are among those which give satisfactory results: butyl acetate, ethyl acetate, acetone, methyl ethyl ketone, methyl isobutyl ketone, toluol, cyclohexanone and ethylene dichloride. Since a preformed vinyl resin "VYHH" film is readily soluble in acetone, methyl ethyl ketone, and methyl isobutyl ketone, these solvents will not usually be employed and more satisfactory results are obtained by the use of less active solvents for this resin, such as ethyl acetate and toluol. When the preformed film is a "Saran" film, a mixture of 50 parts of methyl ethyl ketone and 50 parts of cyclohexanone may be used.

The vinyl resin comprising the secondary film-forming material, when cast upon the expanded vinyl resin preformed film, sets or stabilizes the decorative effects created therein, and possesses the property of adhering to the preformed film, that is, it is compatible with said preformed film. The vinyl resin comprising the secondary film-forming material may be the same or a different vinyl resin than that of which the preformed film is composed.

Usually it will be desirable to employ as the preformed film a vinyl resin of relatively low solubility in the common organic solvents and to employ as the film-forming material for the cast secondary film a vinyl resin which is readily soluble in such solvents; for example, it will generally be desirable to employ a preformed film of "VYNU," "VYNW," "VYNS," "Geon 100 or 200 Series" or other vinyl resin of limited solubility and to cast the secondary film from a solution of "VYHH" or of a polymer of vinyl acetate such as "AYAF" manufactured by Carbide and Carbon Chemicals Corporation, or of other relatively soluble vinyl resins in such common organic solvents as methyl ethyl ketone, acetone, and the like.

The use of a preformed film and a cast secondary film formed of different materials respectively also permits the production of a composite film which has exposed surfaces of different properties. Thus, when a product having an exposed surface resistant to abrasion is desired, the preformed film may be formed of "VYNU," "VYNW," "VYNS," "Geon 100 or 200 Series" or like resins which are more resistant to abrasion than the "VYHH" resins which, for the reason pointed out above, may advantageously be used to form the cast film.

Likewise, it is possible to provide a film, one side of which has a lower thermal tacking point than the other, so that the composite film, when the surface having the lower tacking point is brought into contact with another material or surface, may be adhered thereto by heat and pressure, without rendering tacky or otherwise detrimentally affecting the design on the surface having the higher tacking point.

If desired, a plurality of film may be cast one upon another above or successively upon the opposite faces respectively of the preformed film and in this way multi-color effects may be obtained by the use of different colored dyes or pigments in the various films.

The temperature at which the preformed film is treated with the organic liquid controls to some extent the size of the pattern obtained; the lower the temperature the coarser the pattern. Advantageously, the treatment is conducted at room temperature since under these circumstances no provision is required for heating or cooling either the preformed film or the liquid, but if for some reason it is desired to use this control to get a larger pattern, the secondary film may be cast from the organic liquid at a low temperature, for example 0° or below, and likewise to obtain a smaller pattern, the film may be cast at an elevated temperature up to the boiling point of the organic liquid.

As previously stated, the weight and depth of the organic liquid above the preformed film are further control factors influencing the particular decorative effect obtained. The weight of course, is dependent, first, upon the particular organic liquid employed; secondly on the amount, if any, of the film-forming material, pigments and/or fillers associated with the organic liquid; and thirdly on the depth of the liquid above the film.

As in the case of where the degree of adhesion between the preformed film and the support functions as one of the control factors in governing the height of the perpendicular expansion of the preformed film and consequently the type of pattern obtained thereby, so also does the weight of the liquid influence the extent of the upward expansion of the preformed film. In other words, the greater the weight of the liquid above the preformed film, the less will be the upward expansion of the distorted portions of the film.

Furthermore, if the depth of the liquid is relatively shallow, so that the expanded portions of the preformed film rise above the level of the liquid, there will be larger areas which have a relatively small deposit of the cast film thereon, and the composite finished product will accordingly be of a more uneven over-all thickness.

The depth of the liquid above the preformed film may vary from a very thin wash to an appreciable thickness of one-quarter or one-half inch or even more, but in any event the amount must be sufficient to cause the preformed film to expand as hereindescribed, and with the thicker preformed films larger amounts are required.

Generally, the organic liquid will be applied to the preformed film while the film is supported in a horizontal plane, but in the case of a relatively thin film, if a very thin wash of the organic liquid is desired, it may be advantageous to flow it over the preformed film supported on a surface at a sufficient angle to the horizontal to cause the solution to flow by gravity over the film, for example, to angle from 15° to 60°.

In some instances, where the preformed film is in a continuous strip or web, the casting of the secondary film thereon may be accomplished in the manner disclosed in my aforesaid copending application, i. e. with the preformed film passing around a curved supporting surface and onto a tangentially arranged flat supporting surface disposed horizontally, or, if desired, at an angle to the horizontal, depending upon the effects desired and the type of material employed for activating the preformed film to cause it to expand, for example, or the type of material used in the casting of the secondary film on and in adhesive superimposed relation to the primary preformed film.

In cases where the primary preformed films are inclined to the horizontal, and wherein the secondary film forming material is of the thin wash type, the expanded portions of the preformed film will naturally extend above the organic liquid and, in fact, in this type of application of the organic liquid, maximum expansion of the portions of the preformed film is obtained; for example, the portions of the film may extend as much as an inch above the support.

Likewise, where a relatively small depth of a relatively thin fluid organic liquid is placed above a preformed film supported on a horizontal surface, the expanded portions may rise above liquid level, but if a solution of relatively high viscosity is applied to a depth of about one-quarter inch or more above the preformed film supported in a horizontal plane, the upward expansion will be relatively small and the expanded portions of the preformed film may not rise above the level of the liquid.

The amount of the upward expansion of the distorted portions of preformed film is also dependent on the thickness of the preformed film and in general the relatively thin films provide many small raised portions, whereas the thicker films provide relatively few but proportionally higher and more widely spaced raised portions, all other factors being the same.

In cases where the primary preformed film is in the form of a continuous strip or web and is passed upwardly around a curved surface and moved therefrom directly onto a flat horizontal plane, as noted above, and wherein the secondary film is cast against the upwardly moving arcuate surface of the primary preformed film, various effects may be obtained by varying the viscosity of the secondary film forming solution, or by varying the speed of the upwardly moving film supporting surface on which the primary preformed film is carried, or both; or by varying the thickness of the primary film, or by changing the composition of either or both films, or by making use of changes in any of the previously noted variable control factors.

When the organic liquid causing the expansion of the preformed film contains the film-forming material to be cast upon the preformed film, the depth of the liquid employed not only influences the direct decorative effect obtained but also determines the final thickness of the composite film. Hence in this case, as well as in the case where the film-forming material is applied in the solution after the preformed film has been expanded, the amount of solution containing the film-forming material applied to the preformed film will be determined by the purpose for which the product is produced with a given thickness of preformed film.

For example, if the final product is to be adhered to or laminated with some extraneous support such as cloth, cardboard, paper, leather, wood, metal, or the like, or is to be used for wrapping, packing and other purposes, a relatively thin film will generally be cast upon a relatively thin preformed film will be stabilized without the use of a secondary film, whereas if the final product is to be self-supporting and used in a film form per se, without any extraneous support, a better final product will be produced by using either a thicker primary preformed film with or without a thinner secondary film or by casting a thicker secondary film over a thinner primary film, or by using the thicker film in both the primary and secondary films. The final product may be adhered to or laminated with an extraneous support by the application of sufficient heat or a solvent to render the surface of the film lying in contact with the support tacky, and in this step it may be advantageous to apply pressure to cause adhesion, but in an amount insufficient to destroy the design.

If the composite film comprises a thermosetting or heat-curable resin, either as the cast film or the preformed film or both, the final product may be subjected to a heat, or a heat-and-pressure treatment to convert the resin into the final stage of conversion in which it is no longer fusible or soluble. This may be done as a separate operation or may be done in connection with the adherence of the film to an extraneous support of the type described above.

In addition to the decorative effects obtained by the irregularly interspersed raised and depressed portions of the preformed film resulting from the upward expansion thereof, attractive color or other effects may be obtained by using dyes, pigments, or fillers, in the preformed film or in the cast film or in both. When a pigment or filler is present in the organic liquid which causes the expansion of the preformed film, it may also have a slight influence on the decorative effect obtained.

If the preformed film is transparent and the cast film contains a pigment, the surface of the preformed film may be used as the exposed or wearing surface, and in this case the surface subjected to wear is free from pigments and fillers so that, during the life of the film, crocking and discoloration of the pigment or filler is eliminated.

By employing a transparent film as either the preformed film or the cast film with the other film dyed or pigmented, or by using dyes or pigments in the preformed film different in color from those used in the cast film, contrasting effects will be obtained and the product will have the general appearance of having been both printed and embossed. When a dye is employed in connection with the cast film, any dye may be used which would be soluble in the organic liquid or liquids applied to the preformed film.

When a dye or pigment is used, the solution containing the dye or pigment flows from the perpendicularly expanded high portions of the primary preformed film into the spaces interspersed therewith and lying therebetween, so that the dye or pigment is concentrated in the low areas of the distorted film, and the high areas may contain little or no dye or pigment as contrasted to the low areas.

Under the above-noted circumstances additional contrasting color effects may be obtained; when, for example, the preformed film is transparent and the perpendicularly expanded portions or high spots and areas of the preformed film have risen above the level of the organic liquid, then, a composite film may be obtained in which the high areas which were expanded perpendicularly during the treatment remain transparent, and in which the spaces or low areas which are interspersed with and lie between such high areas are colored by the dye associated with the superimposed cast film, or are made opaque by the pigment included with this secondary film-forming material.

The pigments employed may be any mineral or metallic pigment or any organic pigment which is not deleteriously affected by the organic liquids used in the treatment. Examples of suitable pigments for use in either film are aluminum, bronze, gold, silver, and copper powders; chrome green, ocher yellow; lithophone; titanium dioxide; and the like.

Cotton, rayon, or wool flock; wood flour; leather dust; slate dust; mica; and other fillers adapted for use in the plastic industry in general may also be used as fillers.

Instead of embodying the pigment or filler in the organic liquid used in treating the preformed film, the pigment or filler may be applied to the product prior to the evaporation of the solvent. In the case of a pigment such as a metallic powder, it will be advantageous to dust it upon the treated preformed film while the solution is still present, so that it may sink in the solution and be covered by the cast film subsequently formed.

In cases using fillers or the like, for example cotton, rayon, or wool flock; leather dust; etc., it is advantageous to apply such materials at a time when the solution has been substantially evaporated, but while the cast film is still tacky. In this way, it is possible, if desired, to apply a backing to the composite film without employing a laminating step.

Instead of having the decorative effect substantially the same throughout the entire area of the composite film, predetermined subareas may depict one type of pattern effect while other subareas depict another type. Such a product may be obtained, for example by blocking off these areas from each other, and by treating one subarea or group thereof with an organic liquid which has the characteristics above described for forming a small pattern, and by applying to another subarea or group thereof an organic liquid having the characteristics above described for producing a larger pattern, either in the same color or opacity, or in contrasting colors, or opacities, or in combinations thereof.

If desired, instead of producing a decorative effect throughout the entire area of the film, the decorative effect may be restricted to certain areas thereof. This may be accomplished, for example, by covering any portion of the preformed film which is to remain unaffected by the organic liquid, such as a film of cellophane, "Scotch" tape, or the like; or by blocking off the unaffected area with a frame of suitable contour so that the liquid will not flow into that area; or this order may be reversed by applying the liquid within the confines of the frame and leaving the area lying outside the frame unaffected. The protected area in either case may be of any desired design, for example, a geometric design, or the design of an object. The unaffected area of the preformed film as blocked off from the rest of the film, in either case will not expand or otherwise distort during the treatment, and after the process is completed the protective film or frame may be removed and it will be found that the blocked off area or areas of the preformed film will not have been distorted from the normal plane of the film and that these blocked off areas will retain the original appearance of the preformed film, thereby forming a design in contrast to the pattern of the decorative film as produced in areas adjacent to the plain blocked-off areas.

For certain purposes, it is desirable to have included in the composite product a fabric or a web, fleece or batt of reinforcing fibres or individual filaments in order to impart to the product dimensional stability and improved strength.

Such a product may be prepared by placing the fabric, yarns, filaments or fibres, herein referred to as a "porous layer of fibrous material" on the surface of the preformed film and by casting the second film through and upon the fabric etc. The expansion of the preformed film, as caused by the organic liquid will take place in the same manner as it does when no fabric etc. is employed, and the finished product is in the form of a composite decorative product in which the reinforcing fabric yarns, filaments or fibres constitute an integral part.

Figure 12:
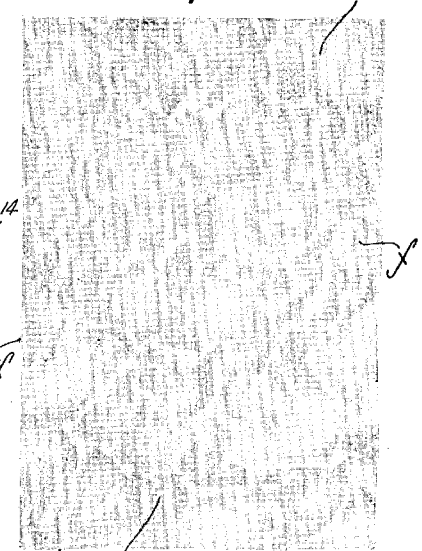

For example, in one embodiment, the fibres may be in the form of a warp of continuous filament rayon; in another example, the fibres may be in the form of a web or heterogeneously disposed fibres such as is found in a carded web, a felt, or a batting; and in another example an open mesh fabric with both warp and filling such as mosquito netting, marquisette, lace, knitted or netted fabric may be employed. A product in which a netting has been included as an integral part is illustrated in Fig. 12 of the drawing.

Instead of using a textile fabric or textile fibres, a fabric or fibres made of metal, glass, rock wool, asbestos, and the like may be used. In addition to providing dimensional stability and increased strength, the fabric or fibre may impart additional decorative effects to the composite product; for example, by using dyed fabric or fibres having a color in contrast to that of the preformed or superposed film or both.

Figure 19:
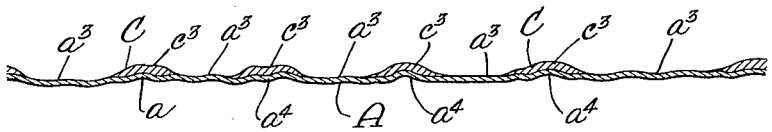

In the accompanying drawings, as a matter of example, the structure shown in Figs. 1 and 19 includes a primary preformed film A, of 2 mil thickness, formed of "VYNU" containing about 15% to 20% plasticizer. This preformed film A was initially cast upon a backing or bearing surface B (see Fig. 14). In this instance the backing surface B consisted of a sheet of paper having a surface coating of thermoset urea-formaldehyde resin (not shown), to which the preformed film A adhered.

Figure 13:
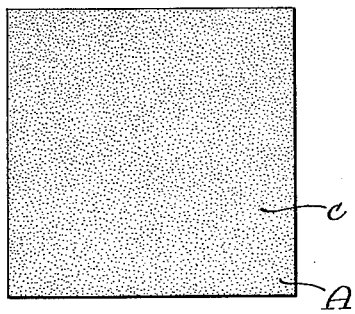
Figure 14:
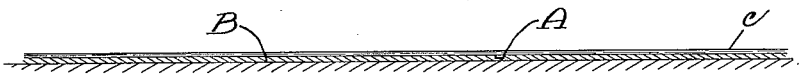

Subsequently a solution $c$, in this case unplasticized "VYHH" and methyl ethyl ketone, was superimposed, as by flooding or washing, over the entire surface of the preformed film A, as shown in Figs. 13 and 14. In this instance, the application of the solution $c$ to the preformed film A was effected with the preformed film A and backing B disposed at an agle of approximately 45°.

The concentration of the methyl ethyl ketone solution $c$ was about 10% solids, by weight, and the preformed film A was colorless, whereas the applied liquid $c$ was dyed with Cibecete red.

Figure 16:
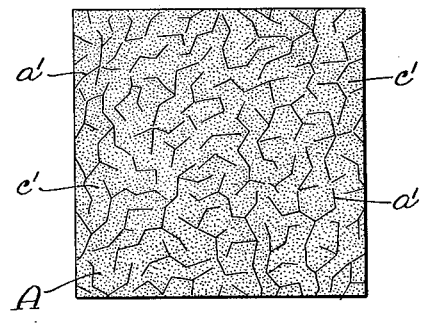
Figure 15:
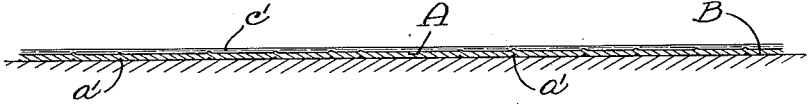
Figure 17:
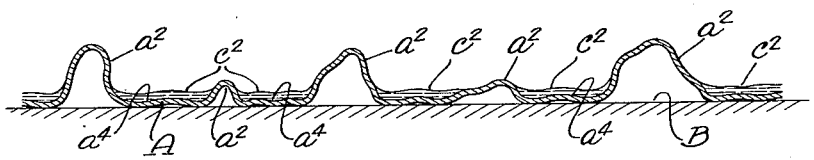
Figure 18:
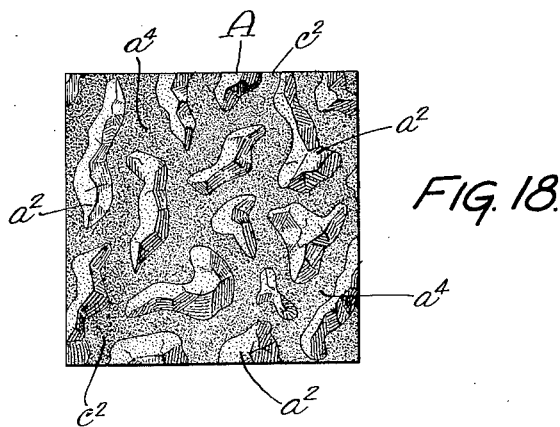

The solution $c$ flowed by gravity down the inclined plane formed by the exposed surface of the preformed film A and deposited a very thin film $c^1$ of the solution $c$ upon the primary preformed film A. The planar expansion action of the preformed film A started immediately and momentarily produced a transitory crackle pattern similar to that shown at $a^1$ in Figs. 15 and 16, after which the preformed film A expanded perpendicularly to the backing surface B in certain relatively spaced sub areas of the preformed film A, as indicated at $a^2$, $a^2$ in Figs. 17 and 18, to a height of approximately ¾ inch to one inch above the original plane of the film A.

When the foregoing state of expansion of the preformed film A was attained, which may or may not be the maximum for the particular film and solvent employed, expansion of the preformed film A ceased.

During subsequent evaporation of the solvent from the thin layer of liquid $c^1$, and resultant casting thereby of the superposed secondary film C on the preformed film A, the peaks $a^2$, $a^2$ collapsed, as shown at $a^3$, $a^3$ in Fig. 19. In the photograph Fig. 1 the portions which were originally peaks $a^2$ constitute the lighter shades, whereas the portions which formed valleys $a^4$, $a^4$, between the peaks $a^2$, $a^2$, show in the photograph Fig. 1 as the darker shades. This is due to the fact that the solution $c$ containing the film-forming material and the red dye flowed down the sides of the peaks $a^2$ and accumulated in interspersed puddles $c^2$ in the valleys $a^4$.

As the solvent evaporated further from the distorted preformed film A and from the puddles $c^2$ of the superimposed film-forming liquid lying in the valleys $a^4$ and clinging to the peaks $a^2$, the preformed film A contracted and returned to an uneven generally flat condition in substantially the original plane of the film A, and the liquid in the puddles $c^2$ solidified and shrunk into amassed interspersed low mounds $c^3$ of irregular contours and varying dimensions, which collectively, and together with whatever minute coating of the solution $c$ which may have remained on the peaks $a^3$, $a^3$ during formation and subsequent collapse thereof, constitute the secondary superimposed film C.

In the preparation of the sample shown in Fig. 2, the same preformed film A was used as above described in regard to Fig. 1. The preformed film was placed at substantially the same angle but the solution $c$ applied in this instance contained a higher solids content than the solution $c$ applied in the case of the sample shown in Fig. 1, namely a solids content in the neighborhood of 20%, all other variable being maintained constant. In this case also, the peaks which formed were not as high and there were greater valley areas between them. This is evidenced by the fact that the lighter collapsed peak portions $a^5$ in Fig. 2 are smaller than the collapsed peak portion $a^3$ in Fig. 1, and that the irregularly contoured interspersed mounds $c^4$ are wider than the mounds $c^3$ of Fig. 1. In this case the peaks corresponding to the peaks $a^2$, supra, rose to only about ½ inch prior to collapsing.

Figure 20:
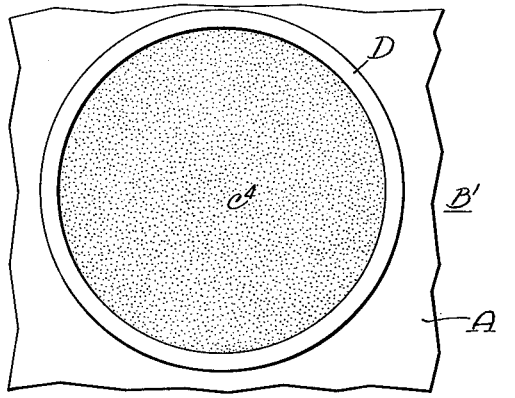
Figure 21:
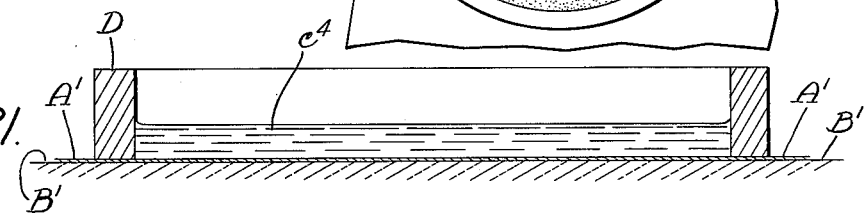
Figure 22:
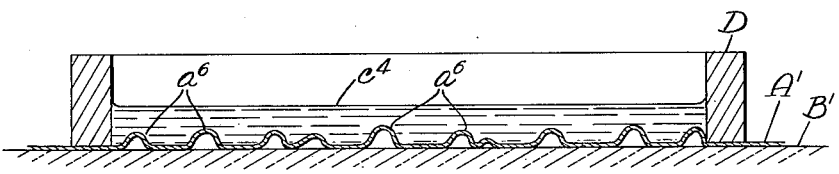
Figure 23:
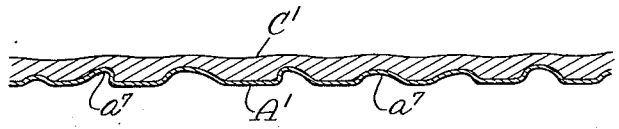

In the instance of the sample shown in Fig. 3, a film $A^1$ of "VYNU" of approximately 1 mil thickness was placed on a clean horizontally disposed glass backing surface $B^1$ and a 20% solution $c^4$ (see Figs. 20 and 21) of "VYHH" dissolved in methyl ethyl ketone and a plasticizer, 30% by weight of the solids, of Flexol 3GH was applied over a predetermined area of the exposed upper face of the primary preformed film $A^1$ within a dam-forming frame D, which bore upon the primary preformed film $A^1$, under pressure of its own weight. The superimposed secondary film-forming liquid $c^4$, in this instance, was poured to a depth of approximately ¼ inch. The portion of the preformed film $A^1$ lying within the confines established by the open frame or dam D was held against planar expansion therebeyond, by the frame D. In this case, the expansive action of the primary film $A^1$ took place rapidly, forming a very large number of small peaks $a^6$, as shown diagrammatically in Fig. 22, none of which protruded above the level of the liquid $c^4$. During subsequent drying of this sample, the peaks $a^6$ only partially collapsed, as shown at $a^7$ in Fig. 23, and correspond to the lighter shaded portions in the finished product shown in Fig. 3. The liquid $c^4$, as applied, was dyed by means of Aridye green in this instance, and after evaporation of the solvent therefrom, during the drying of this sample, the solid content of the liquid $c^4$ solidified into a relatively thick secondary film $C^1$ completely covering the partially collapsed peaks $a^7$ of the primary preformed film $A^1$.

In the case of the sample shown in Fig. 4, the primary preformed film $A^1$, the superimposed secondary film-forming solution $c^4$ and the supporting or backing surface $B^1$ were all the same as in the sample shown in Fig. 3. The solution $c^4$, however, was poured so that it provided a layer of about $\frac{3}{16}$ inch and the solution contained in the neighborhood of about 20% by weight of solids of a white pigment. The resultant cross-section of the final structure was practically the same as in the case of the sample shown in Fig. 3, said cross-section being shown diagrammatically in Fig. 23. In this case the lighter shaded partially collapsed peak portions $a^8$ are of greater areas respectively than the corresponding portions $a^7$ of Fig. 3.

Figure 24:
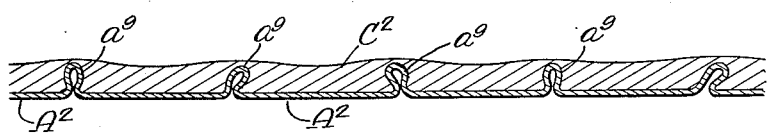
Fig. 24 is an enlarged typical cross-section of the film structure shown in Fig. 5.

In the case of the sample shown in Fig. 5 the base film $A^2$ (see Fig. 24) was a 2 mil film of "VYNU," with a plasticizer content of approximately 15% to 20%. This primary preformed film $A^2$ was cast on a paper backing surface the same as in the sample shown in Fig. 1. The secondary film $C^2$ was cast with methyl ethyl ketone solution using no dye, but a straight pigment, the base solution being like that used in making the sample shown in Fig. 4. The pigment content was about 25% of the weight of the total solids. In this case, the secondary film-forming solution was poured onto the primary preformed film while the latter was supported in a horizontal plane. The pattern depicted in Fig. 5 is larger than the pattern of the sample shown in Fig. 4 and the primary film $A^2$ is formed in completely closed or partially substantially perpendicular loop-like ridges $a^9$ due to two factors: (1) that the primary film $A^2$ is a little thicker than the film $A^1$ supra and (2) that the primary film $A^2$ had a slightly increased amount of adhesion to the paper backing surface on which it was mounted, than did the film $A^1$ of the structure in the sample shown in Fig. 4 to the glass surface on which it was disposed. The ridges $a^9$ in this case are partially collapsed peaks formed as a result of the planar expansion of the primary film $A^2$.

In the sample shown in Fig. 6, a 2 mil "VYNU" plasticized film $A^3$, similar to the primary film A of Fig. 1, was employed. The secondary superimposed film $C^3$ was initially in the form of a gel of vinyl resin, as marketed under the name of "Luplex" by Herbert Heribert. This gel was heated until it became liquid at a temperature around 150° F. to 160° F. It was then poured onto the primary film $A^3$ while the latter was held in a horizontal plane. During the time that the planar expansion of the preformed film was taking place and forming the primary film $A^3$ into peaks $a^{10}$ and valleys $a^{11}$ (Fig. 25) the superimposed secondary film-forming liquid quickly returned to its gelled state. The heat-liquified gel covered the preformed film $A^3$ to a depth of about ¼ inch. The peaks $a^{10}$ did not rise above the liquid level but the voids formed between the under side of the preformed film and the supporting glass were relatively higher than in those cases where a purely liquid secondary film-forming solution was used. The quick reversion of the superimposed liquid to its original gel form prevented the peaks $a^{10}$ of the primary film $A^3$ from collapsing, consequently the peaks $a^{10}$ and valleys $a^{11}$ were retained practically intact, as shown diagrammatically in Fig. 25.

Figure 26:
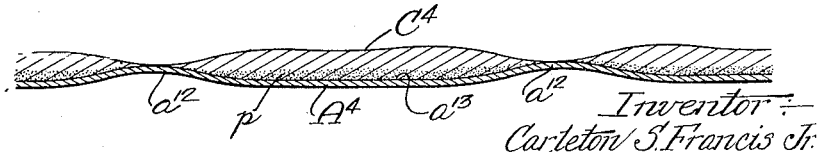
Fig. 26 is an enlarged typical cross-section of the film structures shown in Figs. 7, 8 and 9 respectively.

In the sample of Fig. 7, the base or primary preformed film $A^4$ (see Fig. 26) is a 2 mil film of "Geon 202," sold under the trade name of "Koroseal XP2102" by B. F. Goodrich Company. This primary film $A^4$ was placed on a clean glass surface. The superimposed secondary film-forming liquid was a "VYHH" 20% solution in methyl ethyl ketone, pigmented with Aridye white and a black solvent soluble dye. This liquid was applied to a depth of about ⅜ of an inch. Peaks arose to a height barely projecting through the top surface of the superimposed liquid and later collapsed partially to the extent shown at $a^{12}$ in Fig. 26, which also illustrates the pigment $p$ as having settled out and at least partially filling up the valleys $a^{13}$ between the partially collapsed peaks $a^{12}$ and forming the lower portion of the superimposed secondary film $C^4$ after the solvent had evaporated. The solution applied contained about 20% pigment on the basis of total solids.

The sample shown in Fig. 8 was prepared in exactly the same manner as the sample shown in Fig. 7, using the same primary preformed film $A^4$, but in this case the primary preformed film was pressed onto a surface of paper coated with a thermoset urea-formaldehyde resin. Adhesion was effected by heat and pressure, the heat being just sufficient to render the primary film slightly tacky. On cooling, the paper carrying the film was treated in a horizontal plane with the same solution as used in making the sample of Fig. 7, except that a green dye was present instead of black dye.

In the case of the sample shown in Fig. 9, a 2 mil film of "Geon" as in the sample of Figs. 7 and 8 was used. It was placed on glass to which had been applied a very thin film of glycerine. The subsequently superimposed secondary film-forming liquid was 20% solution of "VYHH" and methyl ethyl ketone containing a red Cibecete dye. This liquid was applied to a depth of $\frac{1}{16}$ of an inch above the primary film. In this case, a planar expansion of the primary film took on the appearance of a number of intersecting ridges with sharp sides. When the film dried, the initially formed intersecting ridges collapsed and produced the design of the finished sample shown in Fig. 9. In this sample, the portions which constituted the ridges were transparent and colorless, see the portions indicated at $A^{12}$ in Fig. 26, due to the fact that the superimposed solution containing the dye flowed from the ridges into the flat portions $a^{13}$ between such ridges.

Figure 10:
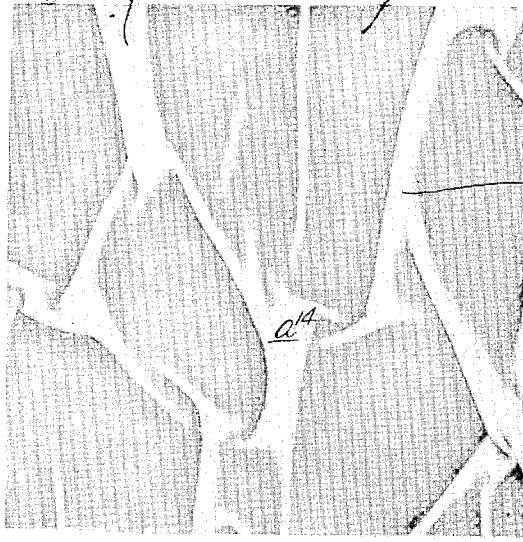

In the sample shown in Fig. 10 a calendered preformed primary film $A^5$ (see Fig. 27) of a pigmented vinyl resin of from 6 to 8 mils in thickness, manufactured by Herbert Heribert supra, was placed on a horizontally disposed glass surface, and a 20% solution of methyl ethyl ketone and "VYHH," containing a red dye and pigment prepared by the Zapon Division of the Atlas Powder Company was applied to the exposed surface of the primary film $A^5$. The superimposed secondary film-forming solution was applied to the exposed face of the primary film to a depth of $\frac{1}{16}$ of an inch. In this case, relatively large and widely separated peaks were formed and extended to a considerable distance above the level of the superimposed liquid, causing the liquid containing the pigment and dye to flow into the valleys $a^{13}$. On drying, the peaks collapsed and in so doing created partial peaks, loop-like ridges, and folds or pleats $a^{14}$ in relatively spaced areas as illustrated in Figs. 10 and 27, with the superimposed secondary film $C^5$, formed by the superimposed liquid from which the solvent had been evaporated and which substantially filled the valleys $a^{14}$ to substantially the tops of the collapsed peaks etc. $a^{14}$.

Figure 11:
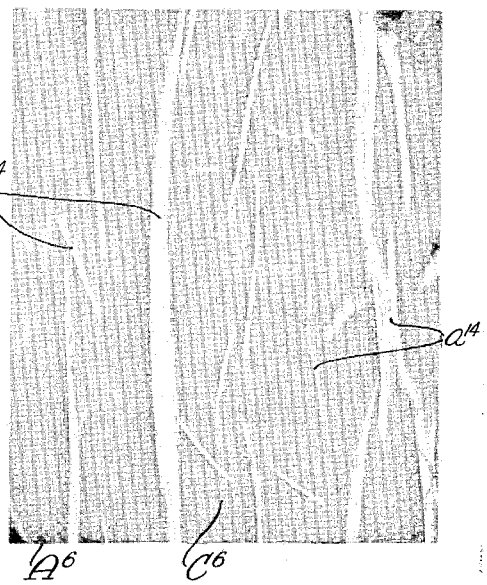

The sample shown in Fig. 10 and the following sample shown in Fig. 11 are to be distinguished from the previous samples of Figs. 1 to 9 inclusive by the fact that the more desirable surface, from the esthetic point of view, is found by viewing the face of the finished product on which the secondary film $C^5$ is superimposed, whereas in the samples of Figs. 1 to 9 inclusive the more esthetic appearance is found by viewing the face on which the preformed film A to $A^4$ inclusive are exposed.

Furthermore, the samples shown in Figs. 10 and 11, and more particularly the sample shown in Fig. 11, illustrate the tendency of a calendered primary preformed film to form peaks, ridges, folds, etc. which are elongated in the direction of the orientation of the resin molecules of the film.

In the case of the product shown in Fig. 11, the same type of preformed film was used as in Fig. 10, except that it was approximately 5 to 6 mils in thickness. The secondary film-forming solution applied to the primary preformed film was a 20% solultion of "VYHH" and methyl ethyl ketone, and contained an Aridye blue dye. In this case, the solution was applied to a depth of about $\frac{1}{16}$ of an inch, and like the preceding sample the peaks rose above the level of the liquid. The peaks in this case were not as widely separated as in the preceding case, due to the preformed film being slightly thinner. Upon the collapse of the peaks, the characteristic foldings and pleatings $a^{14}$ of the flaccid primary film $A^6$ took place and the orientation or elongation of these folds became more pronounced, with the thicker portions of the superimposed secondary film $C^6$ interposed therebetween.

In the case of the sample shown in Fig. 12, a "Geon 20212" 2 mil film was used, i. e. the same film as was used in the sample shown in Fig. 9. In this instance, (Fig. 12) the primary film $A^7$ (Fig. 28) was placed on a clean glass surface and on top of it was placed a rayon marquisette fabric F which was held in position by a frame. The superimposed secondary film-forming solution consisted of a 20% "VYHH" and methyl ethyl ketone mixture containing 30% plasticizer and a blue spirit-soluble dye. The secondary film-forming liquid was applied to a depth just sufficient to cover the cloth. The peaks formed below the cloth F and lifted the cloth, but during subsequent drying these peaks collapsed and the resultant superimposed secondary film $C^7$, cast during the process, caused adherence of the fabric F to the primary film $A^7$ and the secondary film $C^7$, with the warps and/or wefts $f, f$ embedded, at least in part, in the latter, whereby a composite film structure was produced.

In all of the samples described except the samples respectively shown in Figs. 1, 2 and 5, there was about 30% plasticizer based on the weight of the resin in the solultion of the superimposed film.

In the samples described, methyl ethyl ketone has been used as the organic liquid causing the expansion of the preformed film excepting the sample shown in Fig. 6. In other words, the organic liquid has been kept constant for the purpose of illustration and the variations in the depicted designs have been due to changing one or more of the other control factors. It is understood, of course, as pointed out elsewhere herein, that the decorative effects may be varied by varying the organic liquid employed to cause the expansion. Of course, with any particular solvent, comparable variations in the decorative effect, as shown in the photographs of Figs. 1 to 12 inclusive can be obtained by making corresponding changes in the other control factors.

In Fig. 29 a laminated product is shown as having been produced by applying a sheet of felt $F^1$ or other suitable closely constructed fabric to the exposed face of the secondary films $C^3$, $C^4$ or $C^5$ of the film structure shown in Figs. 7, 8 or 9 respectively, for example, while said face was still tacky or after it had been rendered tacky by application of heat or a solvent softener.

Figs. 30a and 30b respectively illustrate laminated structures wherein two of the film structures, such for example as the one shown in Figs. 6 and 25 have been placed back-to-back with the normally exposed faces of the secondary films $C^3$, $C^3$, in either direct contact with each other, as shown in Figs. 30b wherein the two are fused or otherwise caused to adhere in a median zone $F^2$, as by rendering these adjacent faces tacky by heat or solvent, or in indirect contact as shown in Fig. 30a with a sheet of reinforcing fabric $F^3$ of either open or close construction interposed therebetween and adhering to each, with the two secondary films $C^3$, $C^3$ preferably meeting through the interstices of the interposed fabric $F^3$, which latter may be formed of fibrous or synthetic yarns or filaments, metallic strands etc. depending upon the ultimate use for which the complete structure is intended.

In the structures hereinbefore described the primary preformed films A to $A^7$ inclusive have been initially of a substantially uniform thickness throughout their over-all areas, and various ramifications of the pattern or design have been effected by using films of different uniform thickness as one element of pattern control. In Figs. 31, 32, 33 and 34 another control element is introduced by making a single primary film of varying thicknesses in relatively different parts or sub-areas respectively of its over-all area. Then, by using one type of solvent liquid, with or without a secondary film-forming agent contained therein, a plurality of different design effects will be obtained in different sub-areas respectively of said over-all area, as a result of the different reactions of the single superimposed liquid on the different parts of the preformed film having the different thicknesses respectively.

In Fig. 32 for example, a primary film $A^8$ is formed with spaced ribs $a^{15}$ which provides a film of one thickness at these ribs alternating with thinner areas $a^{16}$, and while these ribs may extend in straight lines, longitudinally and/or transversely, and/or diagonally, the ribs $a^{15}$ as shown in Fig. 31 intersect at angles to each other and take on the form of a symmetrical design which will remain apparent in the finished product by influencing the physically created pattern as superinduced by the application of the liquid having a solvent effect on the preformed film, with or without any secondary film-forming ingredients contained therein.

In Fig. 32 the superimposed film-forming liquid $c^{11}$ is applied to the plain non-ribbed face of the primary film $A^8$, but in Fig. 33 the liquid is shown as being applied to the ribbed face of the film and instead of using just one kind of solvent liquid or film-forming liquid in all of the sub-areas $a^{16}$ as defined by the ribs $a^{15}$, different solvent liquids, alone, or solvent liquids $c^{12}$ and $c^{13}$ respectively, containing different secondary film-forming components may be introduced into different single sub-areas $a^{16}$ respectively, or in groups thereof, and these liquids may be poured to a common level in all or to different depths in the various local or sub-areas $a^{16}$ respectively, whereby the number of different design effects occurring in different local or sub-areas of the finished film structure may be multiplied into infinity, particularly when the use of some of the other previously noted control factors are resorted to as well.

Obviously the contours of the local or sub-areas $a^{16}$ may be varied to suit the fancy of the designer and need not be interconnected or formed as identical repeats as shown in Fig. 31.

In Fig. 34 a multi-thickness primary preformed film $A^9$ of gradually varying thicknesses $a^{17}$ and $a^{18}$, with varying depths $c^{17}$ and $c^{18}$ of solvent or film-forming liquid superimposed thereon is illustrated to provide gradually varying changes in the pattern of the finished product as will be controlled by the effects of the varying depths of the liquid on the varying thicknesses of the different local areas of the primary film.

It is to be understood, of course, that the decorative effects depicted in the drawings are merely illustrative and that many other and different effects may be obtained in accordance with the present invention.

While the foregoing courses of procedure have been based upon the application of solvent liquids with or without film-forming components contained therein and with such liquids superimposed on the upper exposed surface of the primary preformed film, it is within the scope of the present invention to reverse this order by applying the solvent agent to the underside of a suitably supported primary preformed film, and wherein the underlying solvent agent for effecting pattern-forming distortion of the preformed film may be in the form of a felt or batt of loose fibrous material saturated with a film-distorting liquid; or the underlying film-distorting agent may be in the form of a liquid solvent, superimposed on an inert liquid not miscible with the liquid solvent, which may be displaced and replaced by the underlying inert liquid to stabilize the design after the planar expansion of the primary film has been effected by the solvent liquid.

Another control factor for extending the possible variations of the over-all design pattern resides in the backing surface against which the primary preformed film rests. For example where an impermeable surface is used the design formed in the overlying primary film is most distinct, whereas, when an extremely permeable surface is used the result is just the opposite, i. e. the design is least distinct and under some circumstances disappears completely when the peaks collapse under contraction of the primary film after it has undergone planar expansion and distortion by the solvent liquid etc. Thus by varying the degree of permeability in different local areas from maximum impermeability to maximum permeability, or by depressing predetermined portions or areas of the backing surface such, for example, as forming grooves or figures of predetermined contours in the backing surface, or by complete elimination of a backing surface in some local areas, a wide range of pattern effects may be obtained by use of this control factor alone.

While any suitable type of apparatus may be employed to carry out the steps of the process for forming the various forms of decorative film falling within the scope of the present invention, Figs. 35 and 36 diagrammatically illustrate a suitable apparatus which constitutes a modification of the apparatus disclosed in my aforesaid copending application Serial No. 571,048, filed January 2, 1945 (now Patent No. 2,439,802).

As shown in Figs. 35 and 36 of the drawings of the present case, the preformed film A, with or without a backing web of paper, cloth etc., is fed onto the outer surface of an endless conveyer belt 6 which passes around a pair of relatively spaced drums or rollers 1a and 1b and tightening idlers 9, 9. The belt 6 passes along and over a rigid supporting platform 12 disposed intermediate the drums 1a and 1b.

Adjacent the drum 1a the belt 6 with the preformed film A thereon passes a reservoir 2 having a flexible film contacting lip or wall 3 the upper edge of which is normally disposed below the level of the solvent or secondary film-forming liquid c contained within the reservoir 2 and making contact with the primary film A above the upper edge of the flexible wall 3, whereby as the belt 6 and primary film A concurrently pass the reservoir 2, a layer of the liquid c is applied to the film A.

In order to confine the liquid c on the film A and at the same time restrict planar expansion of the film laterally on the conveyer belt 6, a pair of traveling dams in the form of flexible bands 10, 10 are brought to bear firmly against the film A adjacent the opposite longitudinal marginal edges respectively thereof. These bands move concurrently with the belt 6 and film A and hold the edges of the film firmly against the underlying belt 6 to limit planar expansion of the film and at the same time confine the superimposed liquid c thereon against running over and around the edges of the film A. The bands 10, 10 pass around idler groove-faced pulleys 11, 11 any of which may be adjustable to effect tightening of the bands 10, 10 when necessary.

In order to evaporate the solvent from the superimposed liquid c, the film A with the liquid c superimposed thereon passes beneath a hood or through a chamber 8 in which may be located a battery of heating lamps 13, 13 or any well known type such as infra-red lamps, or by any other equivalent means of providing a suitable solvent evaporating temperature within the chamber or hood 8. Preferably the hood 8 is connected to any suitable evacuator for the solvent fumes by a conduit 7.

As the film A with the liquid c superimposed thereon advances along the platform 12 beneath the hood 8, the desired expansion of the film A is first effected by the solvent in the liquid c to form the peaks, ridges, etc., as hereinbefore described, which is followed by the total or partial collapse of the peaks and later by the contraction of the preformed film and the superimposed secondary film C, and as the finished product passes from beneath the hood 8, the bands 10, 10 are lifted off and separated from the primary film A leaving the finished product free to be rolled, cut into sheets, or otherwise disposed of as desired.

While the reservoir 2 has been shown as lying adjacent the film A where it passes around the drum 1a prior to the belt 6 and film A passing tangentially from the drum 1a into a flat horizontal run overlying the platform 12, it will be understood that the platform 12 may be disposed wholly or in part on an incline of any desired angle with the reservoir adjacent such angularly disposed portion thereof to effect application of the liquid c to the primary film A in accordance with the disclosure relating to the production of the samples of Figs. 1 and 2 supra. Obviously other apparatus may be used without departing from the spirit of the present invention.

I claim:

1. The process of producing a synthetic resin film product embodying a permanent, ingenerated, decorative design and comprising a vinyl resin base film and a secondary vinyl resin film autogenously welded into a unitary structure by reason of the compatibility of said vinyl resin films which comprises bringing an organic liquid into contact with at least a portion of the surface of a preformed vinyl resin film selected from the group consisting of vinyl esters and vinyl acetals while said preformed vinyl resin film is supported on a surface with the portion of said film with which the organic liquid is in contact expansible in a direction perpendicular to the normal plane of said film but restricted as to planar expansion by substantially maintaining contact between said film and said surface around said portion of said preformed film with which the said organic liquid is in contact, the said organic liquid having at least a partial solvent action on said preformed vinyl resin film; maintaining said organic liquid in contact with said preformed film until a portion of said film throughout the thickness thereof expands, distortively buckles, and extends above said supporting surface in a direction substantially perpendicular thereto; depositing on said preformed film while it is distorted a solution of a compatible secondary vinyl resin film selected from the group consisting of vinyl esters and vinyl acetals in an organic liquid, said last mentioned organic liquid being miscible with the organic liquid first applied to the preformed film; and completely evaporating the residual organic liquid in contact with said film when the desired extent of expansion, distortive buckling, and extension of said preformed film has been effected, thereby providing said autogenously welded unitary film structure having a permanent, ingenerated, decorative design therein.

2. The process of claim 1 wherein the preformed vinyl resin film is formed from a copolymer of vinyl chloride and vinyl acetate; and wherein the vinyl resin in solution is a copolymer of vinyl chloride and vinyl acetate.

3. The process of producing a synthetic resin film product embodying a permanent, ingenerated, decorative design and comprising a vinyl resin base film and a secondary vinyl resin film autogenously welded into a unitary structure by reason of the compatibility of said vinyl resin films which comprises bringing a solution of a vinyl resin in an organic liquid into contact with at least a portion of the surface of a preformed vinyl resin film while said preformed vinyl resin film is supported on a surface with the portion of said film with which the solution is in contact expansible in a direction perpendicular to the normal plane of said film but restricted as to planar expansion by substantially maintaining contact between said film and said surface around said portion of said preformed film with which said solution is in contact, the organic liquid of said solution having at least a partial solvent action on said preformed vinyl resin film and the vinyl resin of said film and of said solution being selected from the group consisting of vinyl esters and vinyl acetals; maintaining said vinyl resin solution in contact with said preformed vinyl resin film until a portion of said film throughout the thickness thereof expands, distortively buckles, and extends above said supporting surface in a direction substantially perpendicular thereto; and completely evaporating the organic liquid of said vinyl resin solution when the desired extent of expansion, distortive buckling, and extension of said preformed film has been effected to deposit the vinyl resin in said solution as a compatible secondary vinyl resin film on said preformed vinyl resin film while the latter film is distorted, thereby providing said autogenously welded unitary film structure having a permanent, ingenerated, decorative design therein.

4. The process of claim 3 wherein the preformed vinyl resin film is formed from a copolymer of vinyl chloride and vinyl acetate; and wherein the vinyl resin in solution is a copolymer of vinyl chloride and vinyl acetate.

5. The process of producing a reinforced synthetic resin film product embodying a permanent, ingenerated, decorative design and comprising a vinyl resin base film and a secondary vinyl resin film with fibrous material between said films autogenously welded into a unitary structure by reason of the compatibility of said vinyl resin films which comprises superimposing a porous layer of fibrous material upon a preformed vinyl resin film; bringing a solution of a vinyl resin in an organic liquid into contact with at least a portion of the surface of said preformed vinyl resin film through said porous layer of fibrous material while said preformed vinyl resin film is supported on a surface with the portion of said film with which the solution is in contact expansible in a direction perpendicular to the normal plane of said film but restricted as to planar expansion by substantially maintaining contact between said film and said surface around said portion of said preformed film with which the said solution is in contact, the organic liquid of said solution having at least a partial solvent action on said preformed vinyl resin film and the vinyl resin of said film and of said solution being selected from the group consisting of vinyl esters and vinyl acetals; maintaining said vinyl resin solution in contact with said preformed vinyl resin film until a portion of said film throughout the thickness thereof expands, distortively buckles, and extends above said supporting surface in a direction substantially perpendicular thereto; and completely evaporating the liquid of said vinyl resin solution when the desired extent of expansion, distortive buckling, and extension of said preformed film has been effected to deposit the vinyl resin in said solution as a compatible secondary vinyl resin film on said porous layer of fibrous material and said preformed vinyl resin film while the latter film is distorted, thereby providing said reinforced autogenously welded unitary film structure having a permanent, ingenerated, decorative design therein.

6. The process of claim 5 wherein the fibrous material is an open mesh fabric; wherein the preformed vinyl resin film is formed from a copolymer of vinyl chloride and vinyl acetate; and wherein the vinyl resin in solution is a copolymer of vinyl chloride and vinyl acetate.

7. A synthetic resin film product embodying a permanent, ingenerated, decorative design and comprising a vinyl resin base film and a secondary vinyl resin autogenously welded into a unitary structure by reason of the compatibility of said vinyl films, said product having been made in accordance with the process of claim 3.

8. A synthetic resin film product embodying a permanent, ingenerated, decorative design and comprising a vinyl resin base film and a secondary vinyl resin film autogenously welded into a unitary structure by reason of the compatibility of said vinyl films, said product having been made in accordance with the process of claim 4.

9. A reinforced synthetic resin film product embodying a permanent, ingenerated, decorative design and comprising a vinyl resin base film and a secondary vinyl resin film with fibrous material between said films autogenously welded into a unitary structure by reason of the compatibility of said vinyl resin films, said product having been made in accordance with the process of claim 5.

10. A reinforced synthetic resin film product embodying a permanent, ingenerated, decorative design and comprising a vinyl resin base film and a secondary vinyl resin film with fibrous material between said films autogenously welded into a unitary structure by reason of the compatibility of said vinyl resin films, said product having been made in accordance with the process of claim 6.

11. The process of claim 1 wherein the preformed vinyl resin film is formed from a vinyl ester; and wherein the vinyl resin in solution is a vinyl ester.

12. The process of claim 3 wherein the preformed vinyl resin film is formed from a vinyl ester; and wherein the vinyl resin in solution is a vinyl ester.

13. The process of claim 5 wherein the fibrous material is an open mesh fabric; wherein the preformed vinyl resin film is formed from a vinyl ester; and wherein the vinyl resin in solution is a vinyl ester.

CARLETON SHURTLEFF FRANCIS, Jr.

REFERENCES CITED

The following references are of record in the file of this patent:

UNITED STATES PATENTS

| Number | Name | Date |
|---|---|---|
| 376,350 | Shephard | Jan. 10, 1888 |
| 988,981 | Danzer | Apr. 11, 1911 |
| 1,146,855 | Emerson | July 20, 1915 |
| 1,258,840 | Wheelwright | Mar. 12, 1918 |
| 1,732,661 | Root | Oct. 22, 1929 |
| 1,864,763 | Root | June 28, 1932 |
| 1,921,819 | Macker | Aug. 8, 1933 |
| 2,064,143 | Belton et al. | Dec. 15, 1936 |
| 2,085,875 | Sirovy | July 6, 1937 |
| 2,122,251 | Hartmann | June 28, 1938 |
| 2,245,289 | Muller | June 10, 1941 |
| 2,279,366 | Childs | Apr. 14, 1942 |
| 2,304,632 | Faelten | Dec. 8, 1942 |
| 2,314,975 | Ford | Mar. 30, 1943 |
| 2,327,765 | Carver | Aug. 24, 1943 |
| 2,344,807 | Drummond | Mar. 21, 1944 |
| 2,360,650 | Crane | Oct. 17, 1944 |
| 2,404,073 | Karfiol et al. | July 16, 1946 |
| 2,440,039 | Brown | Apr. 20, 1948 |